(12) United States Patent
Lee et al.

(10) Patent No.: US 10,530,550 B2
(45) Date of Patent: *Jan. 7, 2020

(54) METHOD AND APPARATUS FOR TRANSMITTING AND RECEIVING CHANNEL-RELATED INFORMATION

(71) Applicants: Samsung Electronics Co., Ltd., Gyeonggi-do (KR); Industry-Academic Cooperation Foundation, Yonsei University, Seoul (KR)

(72) Inventors: Hyojin Lee, Gyeonggi-do (KR); Chungyong Lee, Seoul (KR); Hoondong Noh, Gyeonggi-do (KR); Younsun Kim, Gyeonggi-do (KR); Juho Lee, Gyeonggi-do (KR); Hyoungju Ji, Seoul (KR); Sangwon Park, Seoul (KR); Ilkyu Choi, Seoul (KR)

(73) Assignees: Samsung Electronics Co., Ltd (KR); Industry-Academic Cooperation Foundation Yonsei University (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/781,823

(22) PCT Filed: Apr. 1, 2014

(86) PCT No.: PCT/KR2014/002803
§ 371 (c)(1),
(2) Date: Oct. 1, 2015

(87) PCT Pub. No.: WO2014/163385
PCT Pub. Date: Oct. 9, 2014

(65) Prior Publication Data
US 2016/0065344 A1    Mar. 3, 2016

(30) Foreign Application Priority Data

Apr. 1, 2013 (KR) .................. 10-2013-0035324

(51) Int. Cl.
*H04L 5/00* (2006.01)
*H04B 7/06* (2006.01)
(Continued)

(52) U.S. Cl.
CPC ......... *H04L 5/0053* (2013.01); *H04B 7/0456* (2013.01); *H04B 7/063* (2013.01);
(Continued)

(58) Field of Classification Search
CPC .. H04B 7/0417; H04B 7/0634; H04B 7/0639; H04B 7/0663; H04B 7/0456;
(Continued)

(56) References Cited

U.S. PATENT DOCUMENTS

2005/0047517 A1* 3/2005 Georgios ............. H04B 7/0417
375/267
2008/0080449 A1* 4/2008 Huang ................. H04B 7/0634
370/342

(Continued)

FOREIGN PATENT DOCUMENTS

| KR | 1020080056536 | 6/2008 |
|----|---------------|--------|
| KR | 1020090058494 | 6/2009 |
| KR | 1020130075140 | 7/2013 |

OTHER PUBLICATIONS

PCT/ISA/210 Search Report issued on PCT/KR2014/002803 (pp. 4).

(Continued)

*Primary Examiner* — Khaled M Kassim
*Assistant Examiner* — Najeeb Ansari
(74) *Attorney, Agent, or Firm* — The Farrell Law Firm, P.C.

(57) ABSTRACT

Provided is a method and apparatus for transmitting and receiving channel-related information. A method for allowing a terminal to transmit channel-related information (Continued)

according to an embodiment of the present invention may include: receiving a first signal including data and a reference signal; estimating a modulation order corresponding to a channel state from the first signal; and transmitting channel-related information including a first modulation order indicator (MOI), which indicates the estimated modulation order, to a base station. Accordingly, signals can be efficiently transmitted and received.

12 Claims, 19 Drawing Sheets

(51) Int. Cl.
  *H04L 1/00*     (2006.01)
  *H04W 72/04*    (2009.01)
  *H04B 7/0456*    (2017.01)
(52) U.S. Cl.
  CPC ......... *H04B 7/0626* (2013.01); *H04L 1/0003* (2013.01); *H04L 1/0025* (2013.01); *H04W 72/0406* (2013.01)
(58) Field of Classification Search
  CPC ... H04B 17/345; H04L 5/0048; H04L 1/0003; H04L 1/0009; H04L 1/0026; H04L 1/003; H04W 28/048; H04W 28/06; H04W 24/08; H04W 28/0236
  See application file for complete search history.

(56) References Cited

U.S. PATENT DOCUMENTS

| | | | | |
|---|---|---|---|---|
| 2008/0165875 A1* | 7/2008 | Mundarath | .......... | H04B 7/0417 375/262 |
| 2009/0245408 A1 | 10/2009 | Mujtaba et al. | | |
| 2009/0279512 A1* | 11/2009 | Fujishima | ............ | H04B 7/0617 370/336 |
| 2010/0014500 A1* | 1/2010 | Lee | ....................... | H04L 1/0017 370/342 |
| 2010/0054144 A1 | 3/2010 | Choi et al. | | |
| 2010/0322161 A1 | 12/2010 | Choi et al. | | |
| 2011/0211657 A1 | 9/2011 | Cho et al. | | |
| 2012/0155447 A1 | 6/2012 | Vermani et al. | | |
| 2013/0044727 A1* | 2/2013 | Nory | ..................... | H04L 5/0092 370/330 |
| 2013/0163544 A1 | 6/2013 | Lee et al. | | |
| 2013/0265955 A1 | 10/2013 | Kim et al. | | |
| 2014/0198749 A1* | 7/2014 | Luo | ..................... | H04W 72/042 370/329 |
| 2015/0085767 A1* | 3/2015 | Einhaus | ................ | H04L 1/0001 370/329 |
| 2015/0117249 A1* | 4/2015 | Zhou | ..................... | H04L 1/0026 370/252 |
| 2015/0173064 A1* | 6/2015 | Kim | ........................ | H04B 7/26 370/252 |
| 2015/0289235 A1* | 10/2015 | Park | ........................ | H04L 5/001 370/329 |
| 2015/0326369 A1* | 11/2015 | Kim | ..................... | H04L 5/0057 370/252 |
| 2015/0327119 A1* | 11/2015 | Ko | ........................ | H04L 1/0026 370/252 |
| 2015/0351092 A1* | 12/2015 | Seo | ....................... | H04L 5/0046 370/329 |
| 2015/0358111 A1* | 12/2015 | Marinier | ............... | H04L 1/0003 370/329 |
| 2015/0373694 A1* | 12/2015 | You | ....................... | H04L 5/0051 370/329 |
| 2016/0021551 A1* | 1/2016 | Park | ..................... | H04B 7/0619 370/328 |
| 2016/0021565 A1* | 1/2016 | Kim | ........................ | H04L 5/005 370/329 |

OTHER PUBLICATIONS

PCT/ISA/237 Written Opinion issued on PCT/KR2014/002803 (pp. 6).

HTC, "On Small Cell Enhancement for Improved Spectral Efficiency", R1-130311, 3GPP TSG RAN WG1 Meeting #72, Jan. 28-Feb. 1, 2013, 4 pages.

Korean Office Action dated Jun. 28, 2019 issued in counterpart application No. 10-2013-0035324, 9 pages.

* cited by examiner

FIG. 6

| RS index | Precoder index $\log_2[P^*]$ 6 5 4 3 2 1 | RS index | Precoder index $\log_2[P^*]$ 6 5 4 3 2 1 | RS index | Precoder index $\log_2[P^*]$ 6 5 4 3 2 1 | RS index | Precoder index $\log_2[P^*]$ 6 5 4 3 2 1 |
|---|---|---|---|---|---|---|---|
| 1 | 0 0 0 0 0 0 | 9 | 0 0 1 0 0 0 | 17 | 0 1 0 0 0 0 | 25 | 0 1 1 0 0 0 |
| 2 | 0 0 0 0 0 1 | 10 | 0 0 1 0 0 1 | 18 | 0 1 0 0 0 1 | 26 | 0 1 1 0 0 1 |
| 3 | 0 0 0 0 1 0 | 11 | 0 0 1 0 1 0 | 19 | 0 1 0 0 1 0 | 27 | 0 1 1 0 1 0 |
| 4 | 0 0 0 0 1 1 | 12 | 0 0 1 0 1 1 | 20 | 0 1 0 0 1 1 | 28 | 0 1 1 0 1 1 |
| 5 | 0 0 0 1 0 0 | 13 | 0 0 1 1 0 0 | 21 | 0 1 0 1 0 0 | 29 | 0 1 1 1 0 0 |
| 6 | 0 0 0 1 0 1 | 14 | 0 0 1 1 0 1 | 22 | 0 1 0 1 0 1 | 30 | 0 1 1 1 0 1 |
| 7 | 0 0 0 1 1 0 | 15 | 0 0 1 1 1 0 | 23 | 0 1 0 1 1 0 | 31 | 0 1 1 1 1 0 |
| 8 | 0 0 0 1 1 1 | 16 | 0 0 1 1 1 1 | 24 | 0 1 0 1 1 1 | 32 | 0 1 1 1 1 1 |
| 33 | 1 0 0 0 0 0 | 41 | 1 0 1 0 0 0 | 49 | 1 1 0 0 0 0 | 57 | 1 1 1 0 0 0 |
| 34 | 1 0 0 0 0 1 | 42 | 1 0 1 0 0 1 | 50 | 1 1 0 0 0 1 | 58 | 1 1 1 0 0 1 |
| 35 | 1 0 0 0 1 0 | 43 | 1 0 1 0 1 0 | 51 | 1 1 0 0 1 0 | 59 | 1 1 1 0 1 0 |
| 36 | 1 0 0 0 1 1 | 44 | 1 0 1 0 1 1 | 52 | 1 1 0 0 1 1 | 60 | 1 1 1 0 1 1 |
| 37 | 1 0 0 1 0 0 | 45 | 1 0 1 1 0 0 | 53 | 1 1 0 1 0 0 | 61 | 1 1 1 1 0 0 |
| 38 | 1 0 0 1 0 1 | 46 | 1 0 1 1 0 1 | 54 | 1 1 0 1 0 1 | 62 | 1 1 1 1 0 1 |
| 39 | 1 0 0 1 1 0 | 47 | 1 0 1 1 1 0 | 55 | 1 1 0 1 1 0 | 63 | 1 1 1 1 1 0 |
| 40 | 1 0 0 1 1 1 | 48 | 1 0 1 1 1 1 | 56 | 1 1 0 1 1 1 | 64 | 1 1 1 1 1 1 |

PM(proposed)

METHOD AND APPARATUS FOR TRANSMITTING AND RECEIVING CHANNEL-RELATED INFORMATION

TECHNICAL FIELD

The present invention relates to a method and apparatus for transmitting and receiving channel-related information.

BACKGROUND ART

When using a massive Multiple Input Multiple Output (MIMO) system, a communication service provider can easily satisfy a high data rate, which is required in a next generation communication system after 4G, with only a simple linear precoder by providing a plurality of antennas in a base station. In theory, when using an infinite number of antennas, a communication service provider can perfectly remove various problems, such as fast fading, inter-user interference, and the like, which limit the performance of a system, by using a linear precoder.

When a multiple user system based on the massive MIMO is configured, throughput of the system, which is much higher than that of an existing communication system, can be obtained at a low cost. Such an advantage of the massive MIMO system is based on the assumption that the base station has identified channel information. In a situation where there are a large number of antennas, such an assumption is very burdensome to the system. Therefore, conventional researches on a massive MIMO system have been made based on a Time-Division Duplex (TDD) system in which a channel estimation cost is not affected by the number of antennas of the base station due to channel reciprocity.

Meanwhile, when data transmission amounts of uplink (UL) and downlink (DL) are similar to each other or when a distance between a transmission end and a reception end is long, the TDD system has a frequency efficiency lower than that of a Frequency-Division Duplex (FDD) system due to conversion between a transmission mode and a reception mode. For this reason, conventional communication systems, such as a Universal Mobile Telecommunications System (UMTS), a Wideband Code Division Multiple Access (WCDMA), a CDMA2000, and the like, have supported an FDD mode in various environments. Therefore, researches and development on an FDD massive MIMO system for securing backward compatibility could be considered to be a necessary and sufficient condition which allows the massive MIMO system to be a core technology of the next-generation communication system.

In the FDD system, channel reciprocity is not established. Thus, the FDD system uses a limited feedback system, which quantizes a channel estimated by the reception end and transmits the quantized channel to the transmission end, in order to secure Channel State Information at the Transmitter (CSIT). Meanwhile, conventional researches on the limited feedback show that the size of a codebook for restraining system throughput deterioration caused by the limited feedback in a single stream environment exponentially increases according to the number of transmission antennas. The size of a codebook needed when the environment of a system is expanded to a multi-stream (or multi-user) environment must increase according to a signal-to-noise ratio (SNR) as well as the number of transmission antennas. These facts suggest that the number of pilot signals, feedback channel capacity, the size of a codebook, and the like are main factors which restrain the throughput of the FDD massive MIMO system.

FIG. 1 is a diagram illustrating each modulation scheme.

According to the conventional modulation schemes, such as Quadrature Amplitude Modulation (QAM), Frequency-Shift Keying (FSK), and Phase-Shift Keying (PSK), entities associated with communication transmit and receive information with the sizes of symbols, frequencies, phases, and the like which are differentiated in a time domain or a spatial domain of a signal, as shown in FIG. 1. When a channel gain is high, when various types of interference are small, or when a large transmission power is used, an effective inter-symbol distance "d" at a reception end is lengthened, so that a transmission rate can increase by using a high-order modulation scheme. In a massive MIMO system, a communication service provider can efficiently overcome fading by hardening a channel gain to a path loss using a linear precoding scheme, such as Maximum Ratio Transmission (MRT), Zero-Forcing (ZF), Minimum Mean Square Error (MMSE) filtering, or the like. In addition, the communication service provider can efficiently remove inter-cell or intra-cell interference in the same manner. Therefore, when using a massive MIMO system, the communication service provider can provide a superior performance with the conventional modulation schemes, as compared with the case of using the conventional normal MIMO system.

The characteristic of the massive MIMO system which is robust against fading and interference can be acquired only when a transmission end is completely aware of channel information. In an FDD system, in which channel correlation can be used, a process of acquiring, by a transmission end, channel information may be a large burden on communication entities.

FIG. 2 is a diagram illustrating channel reciprocity in a TDD system.

In a TDD system, a base station can estimate the entire DL channels using UL pilots proportional to the number of antennas of a terminal on the basis of channel correlation, as shown in FIG. 2. In contrast, in an FDD system, since it is impossible to estimate a DL channel through a UL channel, pilot signals proportional to the number of antennas of a base station are required, and a channel estimated by a terminal must be fed back to a base station.

In the FDD system, generally, a transmission end uses a codebook-based limited feedback system, such as DFT or Grassmannian, in order to acquire channel information (CSIT). When a transmission end has one antenna (i.e. $M_T=1$), the number "B" of feedback bits for having a performance difference of 3 dB from a system capable of using the full CSIT regardless of a signal-to-noise ratio (SNR) is expressed as equation 1 below.

$$B = M_T - 1 \qquad \text{[Equation 1]}$$

Here, $M_T$ represents the number of transmission antennas, and the size of a required codebook is "$N=2^B$". This means that, when $M_T=16$, a codebook having the size of "$N=32768$" or greater is required in order to reduce a performance loss to 3 dB or less with respect to the full CSIT. Meanwhile, when there are a plurality of transmission antennas (i.e. $M_T>1$), a difference between the full CSIT according to transmission power ρ and the capacity of limited feedback system is expressed as equation 2 below.

$$C_{CSIT}(\rho) - C_{FB}(\rho) \leq M_T \log_2(1 + \rho \cdot 2^{-B/(M_T-1)}) \qquad \text{[Equation 2]}$$

Referring to equation 2, it can be understood that, when $M_T>1$, the number of feedback bits for constantly maintaining a difference in performance from the case of using the full CSIT increases by ρ as well as by $M_T$. Since the performance of an FDD massive MIMO system is limited by the size of a codebook, as described above, the advantage of the massive MIMO system, such as channel hardening, cannot be provided when "N" is finite although $M_T$ is sufficiently large. That is to say, in the FDD massive MIMO system, it is impossible to easily ensure an effective inter-symbol distance "d" at a reception end through precoding, and thus it is impossible to increase a transmission rate in the conventional modulation schemes.

DISCLOSURE OF INVENTION

Technical Problem

The present invention has been made in order to solve the above problems, and an object of the present invention is to provide an efficient transmission/reception method.

Solution to Problem

In order to achieve the object, a method for allowing a terminal to transmit channel-related information may include: receiving a first signal including data and a reference signal; estimating a modulation order corresponding to a channel state from the first signal; and transmitting channel-related information including a first modulation order indicator (MOI), which indicates the estimated modulation order, to a base station.

In order to achieve the object, a terminal for transmitting channel-related information may include: a communication unit for receiving a first signal including data and a reference signal; and a control unit for estimating a modulation order corresponding to a channel state from the first signal, wherein the communication unit transmits channel-related information including a first modulation order indicator (MOI), which indicates the estimated modulation order, to a base station.

In order to achieve the object, a method for allowing a base station to receive channel-related information may include: transmitting a first signal including data and a reference signal to a terminal; and receiving channel-related information including a first modulation order indicator (MOI), which indicates an estimated modulation order corresponding to the first signal, from the terminal.

In order to achieve the object, a base station for receiving channel-related information may include: a control unit for performing a control to transmit a first signal including data and a reference signal to a terminal; and a communication unit for receiving channel-related information including a first modulation order indicator (MOI), which indicates an estimated modulation order corresponding to the first signal, from the terminal.

Advantageous Effects of Invention

In accordance with the present invention, channel-related information can be efficiently transmitted and received.

BRIEF DESCRIPTION OF DRAWINGS

FIG. 6 is an example of an RS-precoder mapping table for PM transmission and reception.

MODE FOR THE INVENTION

Figure 1:
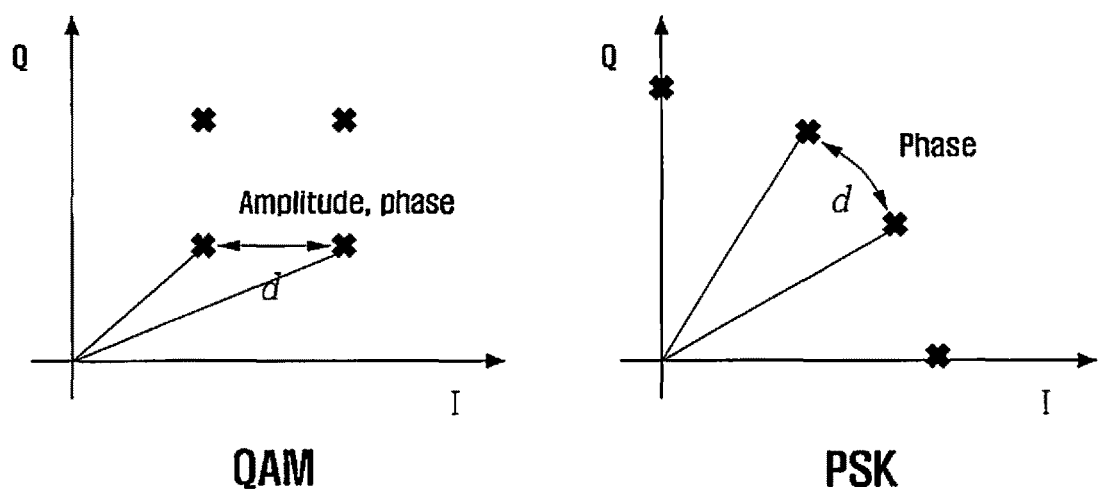
FIG. 1 is a diagram illustrating each modulation scheme.
Figure 2:
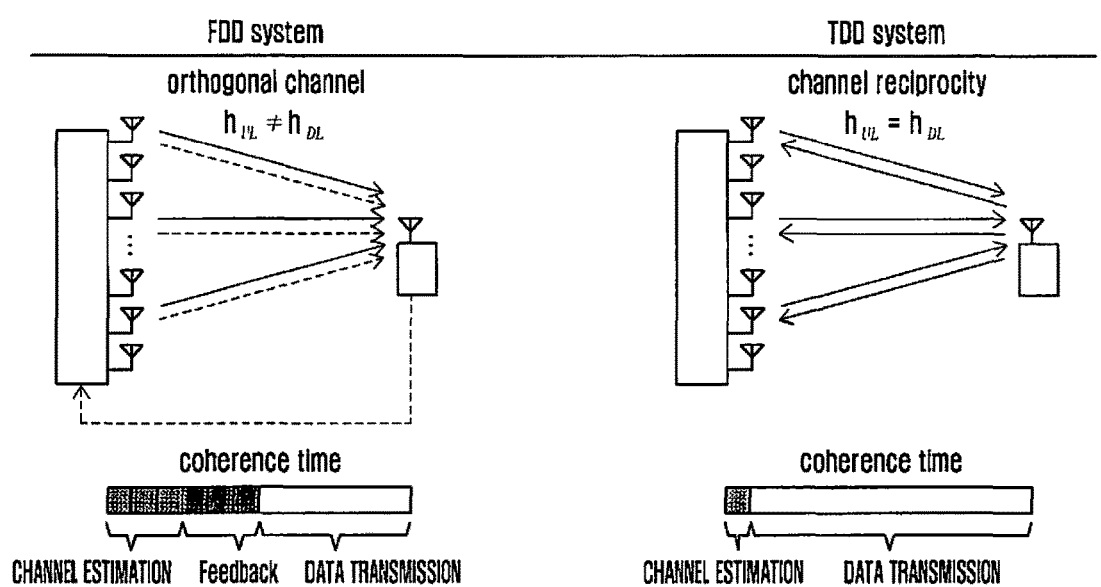
FIG. 2 is a diagram illustrating channel reciprocity in a TDD system.

Hereinafter, exemplary embodiments of the present invention are described in detail with reference to the accompanying drawings.

In describing the example embodiments of the present invention, descriptions related to technical contents which are well-known in the art to which the present invention belongs, and are not directly associated with the present invention, will be omitted. Such an omission of unnecessary descriptions is intended to prevent obscuring of the main idea of the present invention and more clearly transfer the main idea.

For the same reason, in the accompanying drawings, some components may be exaggerated, omitted, or schematically illustrated. Further, the size of each component does not entirely reflect the actual size. In the drawings, identical or corresponding components are provided with identical reference numerals.

An embodiment of the present invention is intended to develop a transceiver for FDD massive MIMO which can flexibly control the number of pilot signals and the size of a codebook according to various environments by efficiently using spatial resources of a massive MIMO system. Especially, an embodiment of the present invention is provided to propose a new modulation scheme for utilizing spatial resources of a massive MIMO system in symbol modulation.

To this end, a detailed purpose desired to be achieved by an embodiment of the present invention is to develop a modulation scheme by which 1) liquidity of channel estimation burden according to situations can be ensured, 2) dependence on feedback can be significantly lower than that in a convention system, and 3) spatial correlation which may be a big problem in a massive MIMO environment can be robust.

According to an embodiment of the present invention, there are provided with: a transmission end for generating a precoder and performing a port modulation (PM); and a reception end for estimating an effective channel and a transmitted precoder, and performing feedback of a channel correlation index (CCI) and/or a modulation order index (MOI).

The modulation order means the number of bits which are loaded on one modulation symbol and are reported from a transmission end to a reception end. Generally, the modulation orders of BPSK, QPSK, 16 QAM, 64 QAM and 256 QAM, which are modulation schemes used in a mobile communication system, are 1, 2, 4, 6 and 8, respectively.

Figure 3:
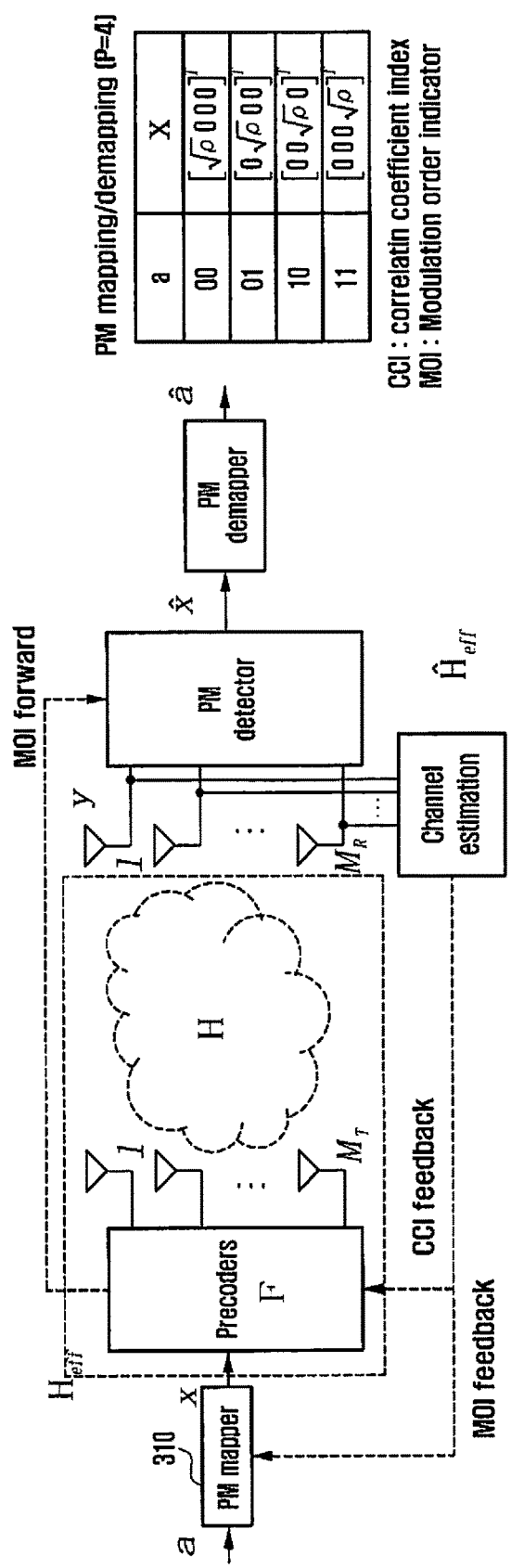
FIG. 3 is a block diagram illustrating the configuration of a MIMO wireless communication system.

FIG. 3 is a block diagram illustrating the configuration of a MIMO wireless communication system.

Referring to FIG. 3, a base station has $M_T$ number of transmission antennas. A terminal has $M_R$ number of reception antennas. A PM mapper 310 maps an information bit sequence "a" to a transmission signal $x=[0, \ldots, 0, \sqrt{\rho}, 0, \ldots, 0]^T$. The transmission signal "x" constituted by a Px1 vector is transmitted to a reception end through a channel and a codebook $F=[f_1, \ldots, f_P]$ constituted by P number of precoders, which are determined offline. In this case, each terminal receives a signal such as the following equation 3.

$$\underset{[M_R \times 1]}{y} = \underset{[M_R \times M_T]}{H} \underset{[M_T \times P]}{F} \underset{[P \times 1]}{x} + \underset{[M_R \times 1]}{n} \quad \text{[Equation 3]}$$

$$= \underset{[M_R \times P]}{H_{eff}} \underset{[P \times 1]}{x} + \underset{[M_R \times 1]}{n}$$

Here, "H" and "$H_{eff}$=HF" are configured according to the following equation 4.

$$H = \begin{bmatrix} h_1^{(row)} \\ \vdots \\ h_{M_R}^{(row)} \end{bmatrix}, H_{eff} = \begin{bmatrix} h_1^{(row)} f_1 & \cdots & h_1^{(row)} f_P \\ \vdots & \ddots & \vdots \\ h_{M_R}^{(row)} f_1 & \cdots & h_{M_R}^{(row)} f_P \end{bmatrix} \quad \text{[Equation 4]}$$

When it is assumed that "a" having a length of "m=log$_2$ P" is mapped to a $j^{th}$ port in equations 3 and 4, a reception signal of a terminal is expressed as the following equation 5.

$$y = \sqrt{\rho} h_{eff,j}^{(col)} + n \quad \text{[Equation 5]}$$

Here, $h_{eff,j}^{(col)} = [h_1^{(row)} f_j, \ldots, h_{M_R}^{(row)} f_j]^T$.

Before an actual data transmission and reception, each terminal estimates P number of ports, and configures the $H_{eff}$ of equation 4. Thereafter, an optical detector for equation 5 may be configured according to the following equations 6 and 7.

$$\hat{j} = \underset{j}{\operatorname{argmin}} \sqrt{\rho} \|h_{eff,j}^{(col)}\|^2 - 2\operatorname{Re}\{y^H h_{eff,j}^{(col)}\} \quad \text{[Equation 6]}$$

$$\hat{x} = \begin{bmatrix} 0, \ldots, 0, \underset{j^{th} element}{\sqrt{\rho}}, 0, \ldots, 0 \end{bmatrix}^T \quad \text{[Equation 7]}$$

According to the embodiment, a codebook is configured in a form in which an existing Discrete Fourier Transform (DFT) codebook or Grassmannian codebook is multiplied by a transmission correlation matrix $R_T$, wherein a $j^{th}$ column of "F" is configured as the following equation 8.

$$f_{R_T^{1/2},j} = R_T^{1/2} f_j / \|R_T^{1/2} f_j\| \quad \text{[Equation 8]}$$

As shown in the following description, the "PM" proposed in the embodiment can obtain a robust characteristic in correlation through a codebook constituted by a precoding vector as expressed in equation 8. In addition, as shown in the following description, since the number of pilots necessary for PM transmission is "P" in number regardless of the number of transmission antennas, an excellent performance can be obtained when the "P" is set by taking the coherence bandwidth (BW)-time of each terminal into consideration.

Figure 4:
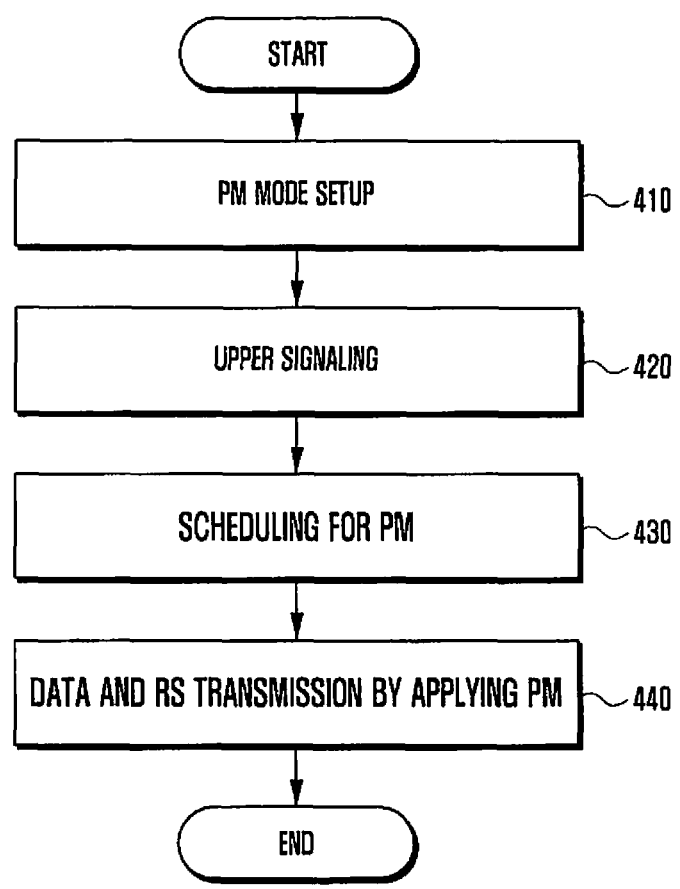
FIG. 4 is a flowchart showing a port modulation process according to an embodiment of the present invention.

FIG. 4 is a flowchart showing a port modulation process according to an embodiment of the present invention.

Referring to FIG. 4, a port modulation (PM) mode is set for a base station at step 410. That is to say, a mode in which an embodiment of port modulation as described later can be applied is set.

When the PM mode is set, the base station provides basic information for communication to a terminal through upper signaling at step 420. The base station performs scheduling for PM at step 430. The base station transmits an RS and data by applying PM at step 440. Detailed operations for the scheduling, and an RS and data transmission/reception processes will be described later with reference to FIGS. 5a and 5b.

Figure 5A:
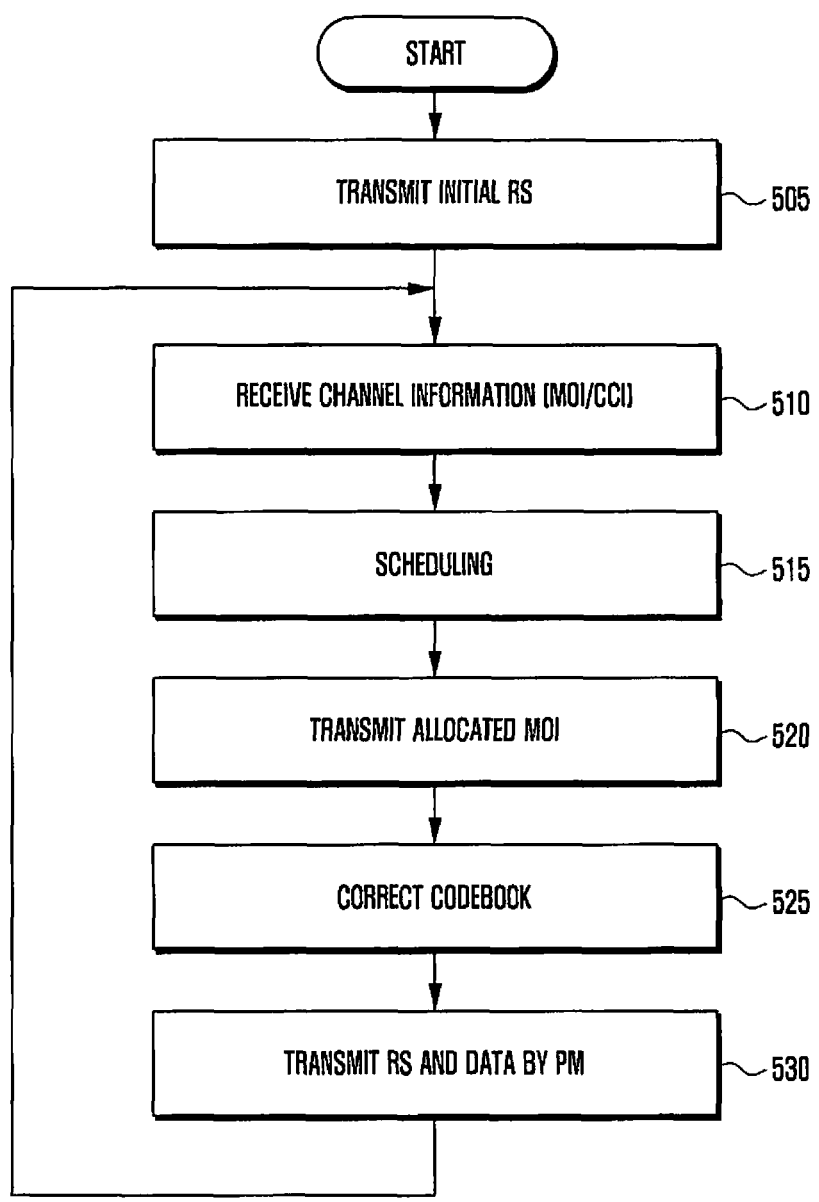
FIG. 5a is a flowchart showing a scheduling process of a base station according to an embodiment of the present invention.

FIG. 5a is a flowchart showing a scheduling process of a base station according to an embodiment of the present invention.

Figure 5B:
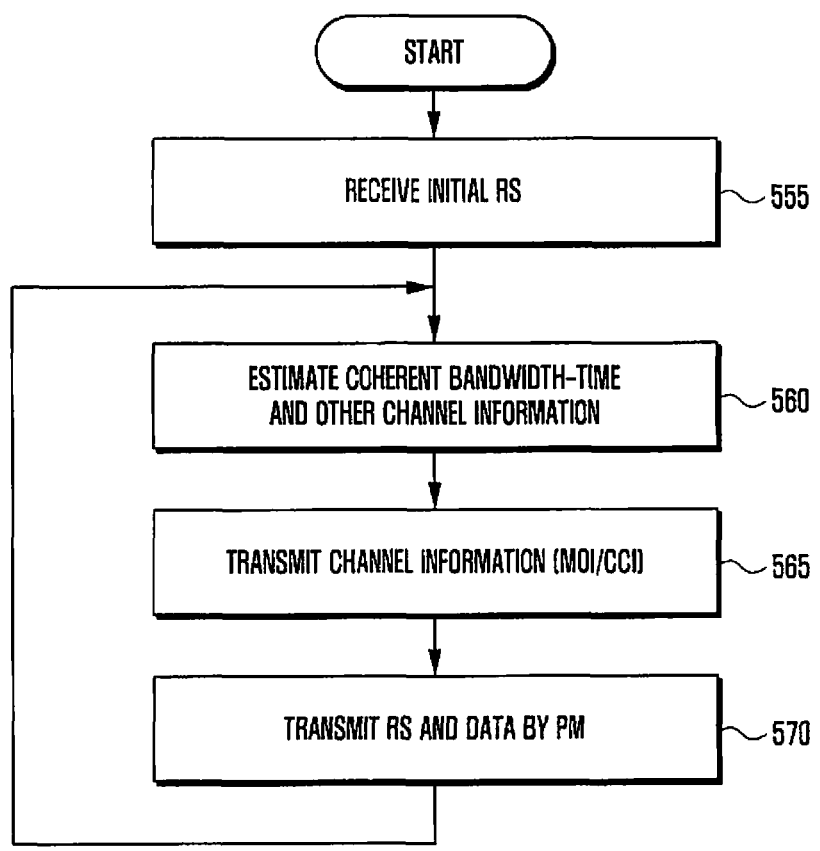
FIG. 5b is a flowchart showing a channel information transmission process of a terminal according to an embodiment of the present invention.

FIG. 5b is a flowchart showing a channel information transmission process of a terminal according to an embodiment of the present invention.

The procedure of FIG. 5a and the procedure of FIG. 5b are performed in interaction between each other.

A PM scheduling may be performed, for example, in order as follows.

Referring to FIGS. 5a and 5b, a base station transmits a reference signal (RS) having a dense structure for channel characteristic estimation to a terminal at step 505. Hereinafter, a reference signal (RS) structure having such a purpose will be referred to as an initial RS or MCS RS, of which a detailed example will be described later with reference to FIG. 7. In this case, a preset specific precoding may be applied with respect to the initial RS.

The terminal receives the initial RS from the base station at step 555.

The terminal estimates a coherent bandwidth-time block and other channel information according thereto using the received initial RS at step 560. The terminal may estimate spatial correlation. On the basis thereof, the terminal may obtain an MOI and/or CCI estimation value. The terminal feeds channel information back to the base station at step 565. The channel information may include at least one of an MOI and a CCI.

The MOI may be separately set depending on each frequency, or may be set to one MOI value which represents the entire system frequency band. Here, whether an MOI for each frequency is to be fed back or one representative MOI is to be set for the entire frequency band may be determined by an upper signal from the base station.

According to a modified embodiment, the base station may estimate transmission-end correlation directly from a UL signal, without feedback of a CCI by the terminal.

The base station receives the channel information at step 510.

The base station performs scheduling to allocate data resources to the terminal by making reference to a received MOI estimation value at step 515. In this case, various scheduling schemes, such as round robin (RR) or proportional fair (PF), may be employed. The base station determines an RS structure to be applied for the terminal. When an MOI from the terminal, or by predetermined periods, the base station may perform scheduling for the terminal and re-adjust an RS structure to be applied for the terminal.

In the scheduling step, the base station determines a modulation order to be used by the terminal. The base station may notify the terminal of an allocated modulation order indicator (MOI) through scheduling information at step 520. Although the terminal transfers an MOI estimation value to the base station at step 510, the base station may apply the MOI estimation value to a corresponding terminal, or may apply another MOI to the corresponding terminal by taking another factor into consideration.

At step 525, the base station compensates a codebook according to an acquired CCI. For example, the base station may compensate a codebook according to spatial correlation. As described above, the base station may receive a CCI from the terminal, or may estimate correlation from a UL signal. The base station may compensate a codebook when receiving a CCI from the terminal. According to a modified embodiment, the base station may compensate a codebook when receiving an MOI from the terminal. According to another modified embodiment, on generation of an event requiring compensation of a codebook, the base station may compensate the codebook when sensing that compensation of the codebook has been required.

At step 530, the base station makes reference to an acquired CCI and an MOI allocated to the terminal, and accordingly, transmits an RS and data, to which a PM scheduling is applied, to the terminal. The base station may transmit an RS and a data symbol after mapping the RS and data symbol using an RS-precoder mapping table. In view of the terminal, the terminal receives the RS and data, to which the PM scheduling is applied, at step 570.

When the PM scheduling is completed, and the respective data resources are allocated to terminals, a PM symbol (data and an RS) is transmitted and received between the base station and the terminal according to the following steps.

The base station allocates an MOI, which is determined by the base station, to the scheduled terminal.

The base station and the terminal may share RS information, which is to be used in PM symbol mapping and de-mapping, through MOI allocation with each other. The base station may determine an RS-precoder mapping table according to an MOI allocated to the terminal, and perform a symbol mapping using the determined table. The terminal may determine an RS-precoder mapping table according to an allocated MOI, and perform a symbol de-mapping using the determined table. The RS information may be generated by mapping MOI allocation information to a specific RS-precoder mapping table. For example, the RS structure may vary depending on a scheduling MCS value.

According to a modified embodiment, the terminal may identify RS information through blind estimation, without a procedure in which the base station transfers MOI allocation to the terminal.

The base station determines the RS structure, for example, the locations of RSs, the number thereof, the density thereof, or the like, of each terminal, and then transmits data and an RS for PM transmission/reception. In this case, a precoding, such as data transmission, for an RS for PM transmission/reception may be applied.

The terminal receives data on the basis of an MOI notified from the base station, or of an MOI and an RS which are estimated by the terminal.

The terminal estimates an SNR and the size of a coherent bandwidth-time block using an RS and data.

According to determination of the base station, an initial RS may be additionally or periodically transmitted and received.

When a trigger event is issued, the terminal may transfer estimated channel information, for example, an MOI and/or a CCI, to the base station. Here, the trigger event may include, for example, sensing of a change in a coherent bandwidth-time and/or in correlation. According to a modified embodiment, the terminal may transfer channel information, e.g. an MOI and/or a CCI, to the base station in a predetermined period.

As understood with reference to explanation to be described later, when an SNR is sufficiently high, the optimal number P* (or density) of RSs according to coherent bandwidth-time $BT_{coh.}$ may be calculated as shown in table 1.

TABLE 1

| Coherent Bandwidth-Time | MOI (P*) |
| --- | --- |
| $0 < BT_{coh.} \leq 6$ | 0(2) |
| $6 < BT_{coh.} \leq 16$ | 1(4) |
| $16 < BT_{coh.} \leq 40$ | 2(8) |
| $40 < BT_{coh.} \leq 96$ | 3(16) |
| $96 < BT_{coh.} \leq 224$ | 4(32) |
| $224 < BT_{coh.}$ | 5(64) |

Since "P*" is variable, a PM mapping/de-mapping table must be variable as well. A mapping table between RS and precoder indexes which can be efficiently shared between the base station and the terminal is required.

FIG. 6 is an example of an RS-precoder mapping table for PM transmission and reception.

When starting an operation in a PM mode, or while PM transmission and reception is being performed, the base station and the terminal may determine which part in FIG. 6 is to be used according to the transmission and reception of an MOI value. For example, when P=8, a precoding index range of 0-3 may be used. When P=64, the entire shown in FIG. 6 may be used. A detailed embodiment with respect to FIG. 6 is as follows.

The base station and the terminal shares an RS-precoder mapping table, which is the same as or similar to that shown in FIG. 6, with each other in advance.

When a coherent bandwidth-time trigger event is generated, the terminal feeds an estimated MOI back to the base station. In this case, the coherent bandwidth-time trigger event may include, for example, a case where an estimated $BT_{coh.}$ deviates from a range represented by the number "P" of current RSs which is defined in table 1. In addition, the base station may transmit an initial RS for MOI estimation by preset constant periods, and on the basis of the transmitted initial RS, the terminal may periodically estimate and feeds an MOI back to the base station.

The base station may determine "P" on the basis of the fed-back MOI, and notify the terminal of the determined "P" through an upper signaling. The base station modulates an information bit sequence on the basis of the determined "P" and the RS-precoder mapping table, and then transmits the modulated information bit sequence. The terminal demodulates a received PM signal on the basis of the notified "P" and the RS-precoder mapping table.

When the proposed method is applied, the density of an RS can be controlled according to the modulation order of a modulation scheme which is employed in a transmission end. That is to say, an RS structure having a high density may be used when a modulation order is high, and an RS structure having a low density may be used when a modulation order is low. Such a method may be applied even when BPSK, QPSK, 16 QAM, 64 QAM, 256 QAM, or the like, which is an existing modulation scheme, is used. Generally, when an existing modulation scheme is used, a modulation scheme having a higher modulation order requires a relatively superior channel estimation capability. In order to satisfy such requirements, when a modulation order is higher, an RS having a higher density is transmitted. A change in the density of an RS depending on the modulation order of a modulation scheme, as described above, must have been identified by not only a transmission end for performing transmission according to a modulation scheme, but also by a reception end for performing reception thereof. That is to say, a receiver must have identified a change in the density of an RS depending on a modulation scheme in order to enable channel estimation of a received signal and data restoration. On method for solving such a matter is to use a predetermined relation with respect to a modulation order and an RS density between a transmission end and a reception end. That is to say, with respect to a specific modulation order, an RS density and the location of the corresponding RS are determined according to what is preset for the modulation order. In this case, a transmission end notifies a reception end of an MOI, and thus a corresponding can be notified of an RS density and the location of the corresponding RS.

A PM is a technique using a random constellation. When a PM is used, a trade-off relation exists between the increase of a data transmission rate and the increase of a constellation estimation cost according to an increase in the size of a constellation. Therefore, on a PM, an optimal throughput performance can be obtained by changing a modulation order according to the situation of a terminal, and particularly, according to coherent bandwidth-time.

Figure 7:
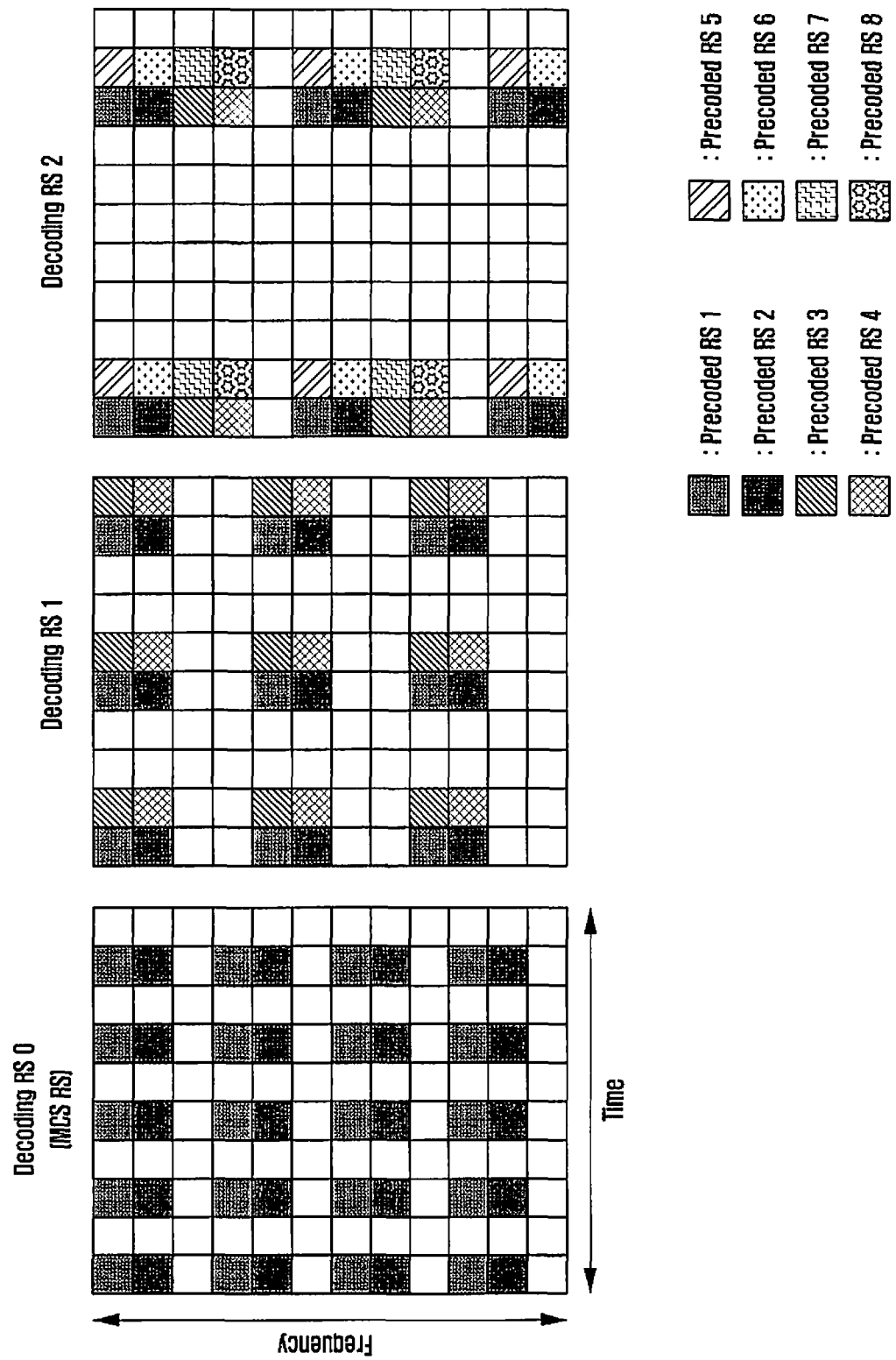
FIG. 7 is a diagram illustrating the frequency-time structures of an RS and data according to an embodiment of the present invention.

FIG. 7 is a diagram illustrating the frequency-time structures of an RS and data according to an embodiment of the present invention.

The precoded RS structure of FIG. 7 is a conceptual diagram. On actual implementation, the locations of precoded RSs, the number thereof, or the density thereof may vary according to circumstances. When the size of a coherent bandwidth-time block of a terminal is small, or when a PM operation starts, a base station uses an RS 0 structure, in which a modulation order is low and precoded RSs are densely disposed, so that a terminal can accurately measure coherent bandwidth-time. The RS 0 structure may be used as an MCS RS, which is periodically transmitted to measure the coherent bandwidth-time of a terminal. The RS 0 structure and the MCS RS structure has the same meaning as the initial RS, which is described with reference to FIGS. 5a and 5b. When the size of a coherent bandwidth-time block of a terminal is determined to be large, a base station can increase the throughput thereof using an RS structure of an RS 1 structure or upper, i.e. an RS structure in which RS are more rarely used.

Figure 8:
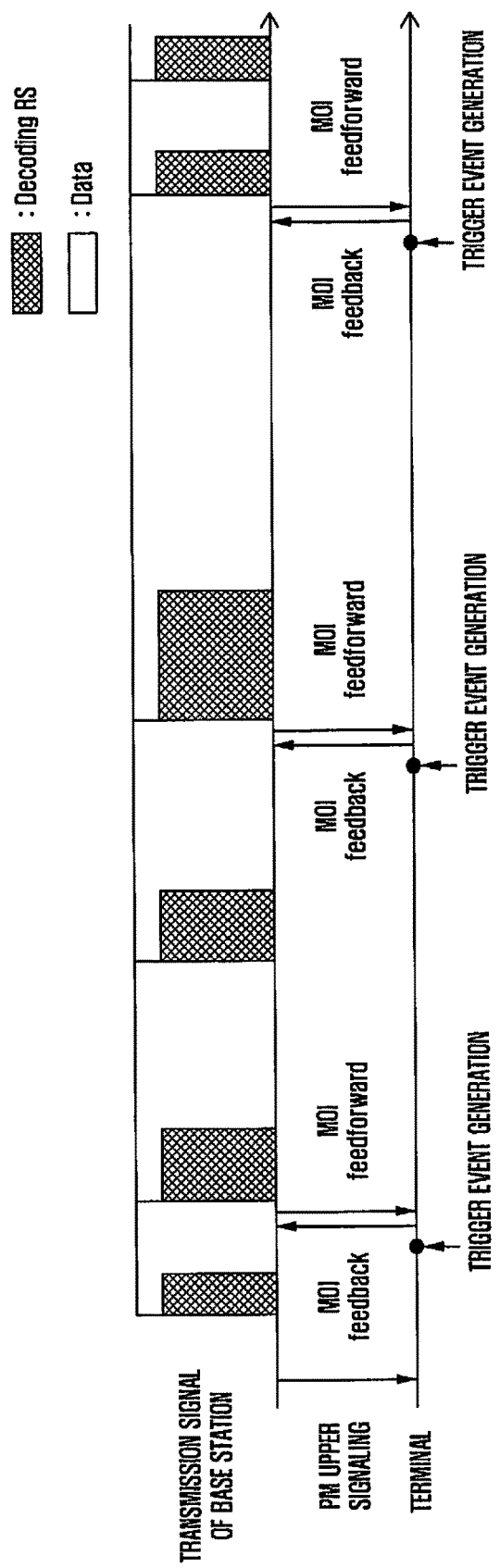
FIG. 8 is a diagram showing a transmission/reception process according to an embodiment of the present invention.

FIG. 8 is a diagram showing a transmission/reception process according to an embodiment of the present invention.

According to an embodiment shown in FIG. 8, a base station does not periodically use an MCS RS structure. Since the MCS RS structure is not periodically used, a modulation order is updated by a trigger event of a terminal. A PM system according to the scheme shown in FIG. 8 may operate in a following method.

The base station transmits control information for PM transmission/reception to the terminal, and then transmits a symbol of an RS 0 structure to the terminal.

The terminal measures channel coherence, estimates an MOI when a trigger event is generated, and then transmits the estimated MOI to the base station. When receiving the MOI, the base station changes the RS structure of a transmission signal, e.g. the number RSs or the density thereof, according to an RS structure as shown in FIG. 7. The terminal continuously estimates channel coherence while receiving data. When a trigger event is generated, the terminal transmits an estimated MOI to the base station so as to update the RS structure of a reception signal.

Figure 9:
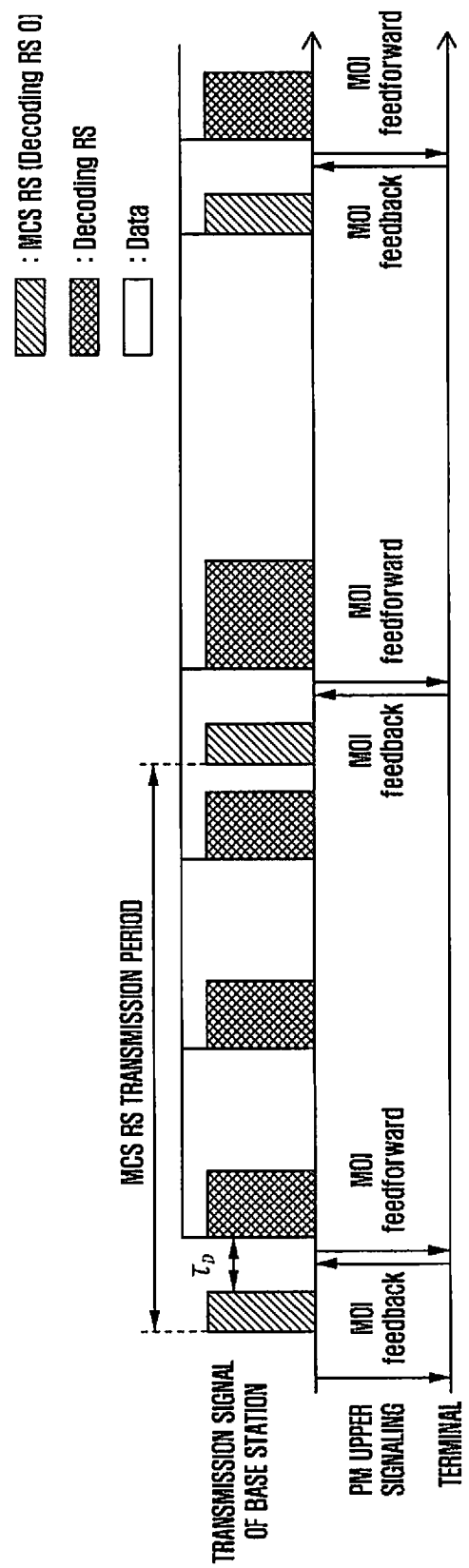
FIG. 9 is a diagram showing a transmission/reception process according to another embodiment of the present invention.

FIG. 9 is a diagram showing a transmission/reception process according to another embodiment of the present invention. According to an embodiment shown in FIG. 9, a base station periodically transmits an MCS RS structure. In this case, a terminal is not required to continuously measure channel coherence. Only when receiving an MCS RS, the terminal measures channel coherence, and transmits an estimated MOI to the base station. A PM system according to FIG. 9 may operate in a following method.

The base station transmits control information for PM transmission/reception to the terminal, and then transmits an MCS RS by predetermined periods. When receiving the MCS RS, the terminal measures channel coherence, and then transmits an MOI to the base station. The base station receives the MOI, and then change an RS structure, e.g. the number of RSs and/or the density thereof. When a predetermined period of time has elapsed after the base station transmits the MCS RS to the terminal, the base station transmits data and RSs of an updated RS structure.

Figure 10:
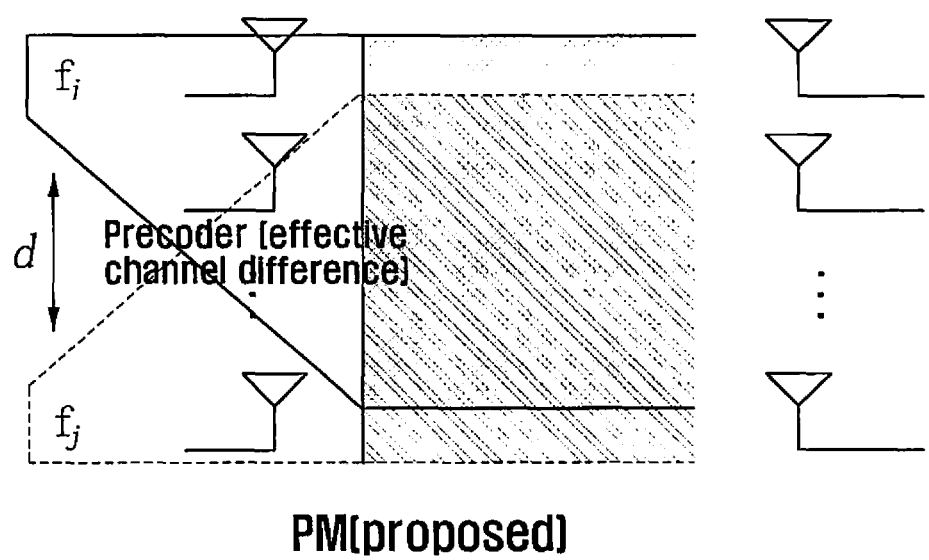
FIG. 10 is a diagram illustrating a PM structure.

FIG. 10 is a diagram illustrating a PM structure.

As shown in FIG. 10, PM according to an embodiment of the present invention corresponds to a modulation scheme using a random constellation mapping on the basis of connection of a spatial domain and a precoding domain. Such a scheme makes it possible to easily ensure an effective inter-symbol distance in a reception end through simple correction using transmission correlation in spite that the PM uses random constellation. In addition, the PM converts channel estimation and feedback overhead, which are generated when a massive MIMO system is established using an existing modulation scheme or a limited feedback system, into an effective channel estimation overhead. Due to such characteristics, the following advantages can be obtained when the PM is used in an FDD massive MIMO system.

First, the costs can be reduced. As compared with the conventional antenna selection schemes or the like, a robust characteristic against power limitation of each antenna port or each antenna element can be maintained. Since an RF chain having a small output can be configured, it is possible to maintain the advantages of an existing massive MIMO system, that the unit cost of production for each module is low, active cooling is not required, and the like. In addition, the embodiments of the present invention may be implemented on the basis of TDD massive MIMO hardware.

A method for establishing a codebook is easy. An FDD massive MIMO system may be configured using an existing DFT codebook or Grassmannian codebook. In addition, a codebook can be easily corrected using a transmission-end correlation coefficient, transmission-end antenna geometry, or the like. In view of a codebook, lower compatibility with respect to an existing terminal can be easily ensured.

The cost for channel estimation is variable. Since a variable RS structure is used, an efficient disposal according to the situations of a terminal is possible. A service can be provided even to a terminal which cannot cope with a large burden for channel estimation and feedback due to large frequency selectivity or a short coherence time.

A codebook correction procedure for PM using transmission antenna correlation will be described below in more detail.

An average bit error probability of PM has an upper bound as shown in the following equation 9.

$$\bar{P}_b \leq \sum_{i=1}^{P} \sum_{j=i+1}^{P} \frac{2N(i,j)}{P} PEP(i \rightarrow j) \quad \text{[Equation 9]}$$

In this case, N(I, j) represents the number of bit errors between an $i^{th}$ symbol and a $j^{th}$ symbol, and PEP(i→j) represents a pairwise error probability between an $i^{th}$ symbol and a $j^{th}$ symbol in a PM system. The PEP of PM is determined by a difference between column vectors of an effective channel, and thus may be calculated according to the following equation 10.

$$PEP(i \rightarrow j) = Q\left(\sqrt{\frac{\rho}{4N_0} \|h_{\mathit{eff},i}^{(col)} - h_{\mathit{eff},j}^{(col)}\|_F^2}\right) \quad \text{[Equation 10]}$$
$$= Q\left(\sqrt{\frac{\rho}{4N_0} \|H(f_1 - f_j)\|_F^2}\right)$$

In this case, $N_0$ represents the dispersion of noise. Through equations 9 and 10, it can be understood that a codebook "F" minimizing PEP(i→j) is an optimal codebook of PM. Through equation 11, an optimal codebook can be obtained.

$$F_{opt} = \arg\min_{F \in F_\infty} \left\{ \max_{1 \leq i \leq j \leq P} Q\left(\sqrt{\frac{\rho}{4N_0} \|H(f_1 - f_j)\|_F^2}\right) \right\} \quad \text{[Equation 11]}$$
$$= \arg\max_{F \in F_\infty} \left\{ \min_{1 \leq i \leq j \leq P} \|H(f_i - f_j)\|_F^2 \right\}$$

Here, $F_\infty$ represents a codebook bank which has an infinite number of codebooks. In order to find an optimal codebook $F_{opt}$ satisfying equation 11, a transmission end must be completely aware of channel information, and solve a Grassmannian line packing problem whenever a channel is changed. This requires a large amount of feedback and a large amount of calculation.

Meanwhile, since one of the advantages of PM is that feedback can be significantly reduced as compared with an existing system, finding an optimal codebook as shown in equation 11 may be a large burden. When it is assumed that correlation between reception antennas is zero, a difference of column vectors between effective channels may be bounded according to the following equation 12.

$$\left| R_R^{1/2} H_W R_T^{1/2} (f_i - f_j) \right|^2 \leq \sum_{i=1}^{M_R} \|h_i^{(row)}\|^2 \|R_T^{1/2}(f_i - f_j)\|^2 \quad \text{[Equation 12]}$$

Here, $R_R$ represents an $M_R \times M_R$ reception antenna correlation matrix, and $R_T$ represents an $M_T \times M_T$ transmission antenna correlation matrix. $H_w$ represents an $M_R \times M_T$ Rayleigh fading channel matrix. $h_i^{(row)}$ represents an row vector of $R_R^{1/2} H_W$. By equation 12, when it is assumed that a transmission end is aware of only correlation between transmission antennas, it can be understood that an expected value of the PEP can be minimized by maximizing $\|R_T^{1/2}(f_i - f_j)\|^2$. That is to say, when a transmission end is not aware of instantaneous channel information, an optimal codebook can be obtained using the following equation 13.

$$\tilde{F} = \arg\max_F \left\{ \min_{1 \leq i \leq j \leq P} (f_i - f_j)^H R_T (f_i - f_j) \right\}, \quad \text{[Equation 13]}$$
where $\|f_i\|^2 = 1 \forall i$ When $R_T = I$, equation 13 becomes the same as an existing codebook generation condition, and $\tilde{F}$ can be easily obtained through a DFT codebook or a Grassmannian line packing solution. In contrast, when $R_T \neq I$, two methods of maximally reduce an influence by $R_T$ (zero-forcing type; ZF type) or maximally using an influence by $R_T$ (matched filter type; MF type) may be considered in order to obtain $\tilde{F}$. An average reception chordal distance is defined according to the following equation 14.

$$d_R(i,j|H,F) = E_{H_w}\{\|H(f_i - f_j)\|_F^2\} \quad \text{[Equation 14]}$$

When it is assumed that $f_i$ is an $i^{th}$ column vector of a DFT codebook, an $i^{th}$ column vector in the ZF type codebook may be configured as $f_{ZF,i} = (R_T^{1/2})^{-1} f_i / \|(R_T^{1/2})^{-1} f_i\|$. Therefore, when the ZF type codebook is used, equation 14 is arranged in the form of equation 15.

$$d_{R,ZF}(i,j|H,F_{ZF}) = \left( \frac{f_i^H}{\|(R_T^{1/2})^{-1} f_i\|} - \frac{f_j^H}{\|(R_T^{1/2})^{-1} f_j\|} \right) \quad \text{[Equation 15]}$$
$$F_{H_w}\{H_W^H R_R H_W\} \left( \frac{f_i}{\|(R_T^{1/2})^{-1} f_i\|} - \frac{f_j}{\|(R_T^{1/2})^{-1} f_j\|} \right)$$

Since $R_T^{1/2}$ is a symmetric matrix, an eigenvalue decomposition of $R_T^{1/2} = U\Lambda U^H$ is possible. Here, $\Lambda = \text{diag}(\lambda_1, \ldots, \lambda_{M_T})$ and $U = [u_1, \ldots, u_{M_T}]$ are matrixes having the eigenvalues and eigenvectors of $R_T^{1/2}$, respectively, as the elements thereof. Using the $\Lambda$ and $U$, the denominator part of equation 15 may be arranged as equation 16.

$$\|(R_T^{1/2})^{-1} f_i\| = g_i^H (\Lambda^{-1})^2 g_i \quad \text{[Equation 16]}$$
$$= \frac{1}{\lambda_1^2} g_1^* g_1 + \ldots + \frac{1}{\lambda_{M_T}^2} g_{M_T}^* g_{M_T}$$

Here, since $g_i = U^H f_i$, $\sqrt{g_j^* g_j}$ comes to the value of a dot product of two random unit vectors. According to equation 16, it can be understood that, as $\lambda_{M_T}$ is smaller, an expected value $E_F\{d_{R,ZF}(i,j|H,F_{ZF})\}$ of equation 15 comes to a smaller value.

Meanwhile, an $i^{th}$ column vector of an MF-type codebook may be configured as $f_{MF,i} = R_T^{1/2} f_i / \|R_T^{1/2} f_i\|$. Therefore, when an MF-type codebook is used, equation 14 may be arranged in the form of the following equation 17.

$$d_{R,ZF}(i,j|H,F_{MF}) = \left(\frac{f_i^H R_T}{\|R_T^{1/2} f_i\|} - \frac{f_j^H R_T}{\|R_T^{1/2} f_j\|}\right) \quad \text{[Equation 17]}$$

$$E_{H_w}\{H_w^H R_R H_w\}\left(\frac{R_T f_i}{\|R_T^{1/2} f_i\|} - \frac{R_T f_j}{\|R_T^{1/2} f_j\|}\right)$$

Similarly to the case of a ZF-type codebook, the numerator and denominator of equation 17 may be arranged in the forms of the following equations 18 and 19.

$$\|R_T f_i\|^2 = g_i^H \Lambda^4 g_i \quad \text{[Equation 18]}$$
$$= \lambda_1^4 g_1^* g_1 + \ldots + \lambda_{M_T}^4 g_{M_T}^* g_{M_T}$$

$$\|R_T^{1/2} f_i\|^2 = g_i^H \Lambda^2 g_i \quad \text{[Equation 19]}$$
$$= \lambda_1^2 g_1^* g_1 + \ldots + \lambda_{M_T}^2 g_{M_T}^* g_{M_T}$$

According to equations 18 and 19, when an MF-type codebook is used, it can be understood that, as $\lambda_1$ is larger, an expected value $E_F\{d_{R,MF}(i,j|H,F_{MF})\}$ of equation 17 comes to a larger value.

The above results show that a system performance is deteriorated by the minimum eigenvalue of a transmission correlation matrix when a ZF-type codebook is used, and a system performance is enhanced by the maximum eigenvalue of a transmission correlation matrix when an MF-type codebook is used. Therefore, an embodiment of the present invention is configured such that each terminal estimates and feeds a transmission correlation matrix back to a base station, or a base station directly estimates $R_T$ using a UL signal, thereby enhancing a system performance.

Figure 11A:
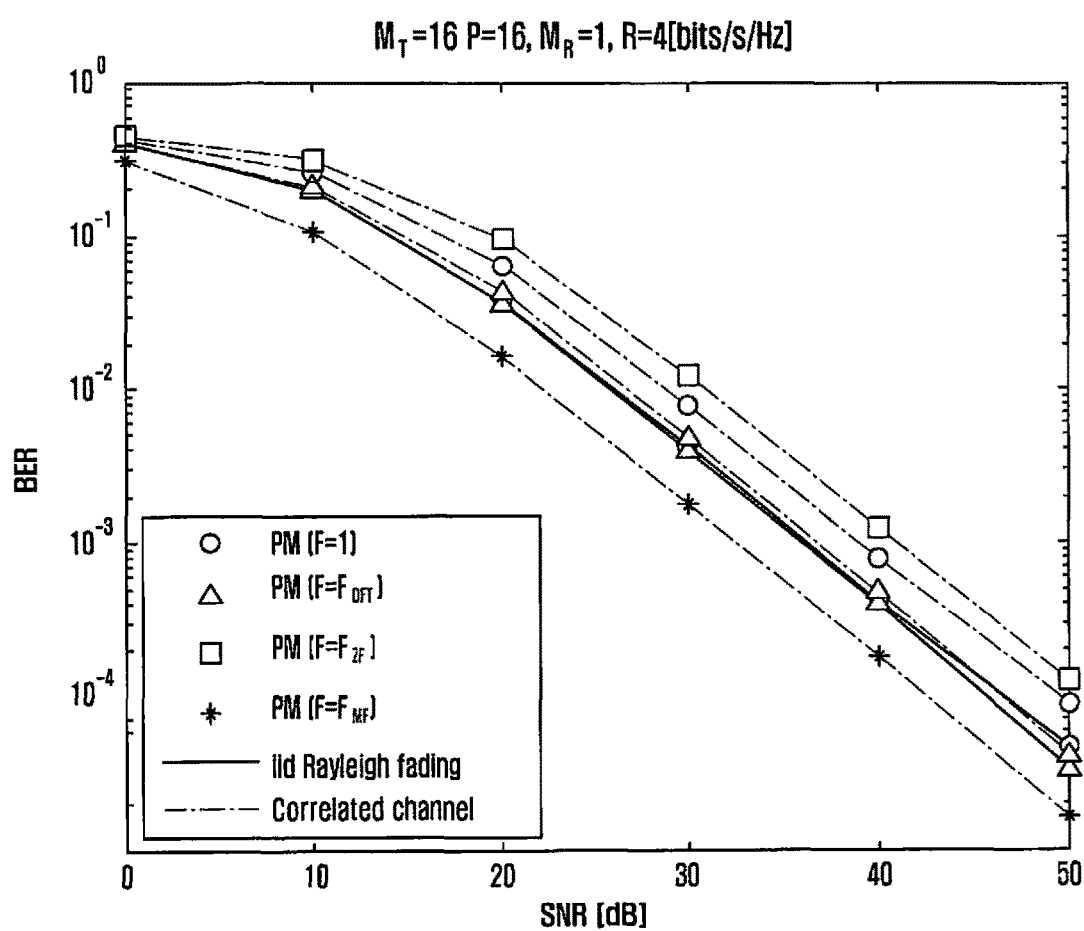
FIGS. 11a and 11b show examples of BER performance graphs according to each type of codebooks.
Figure 11B:
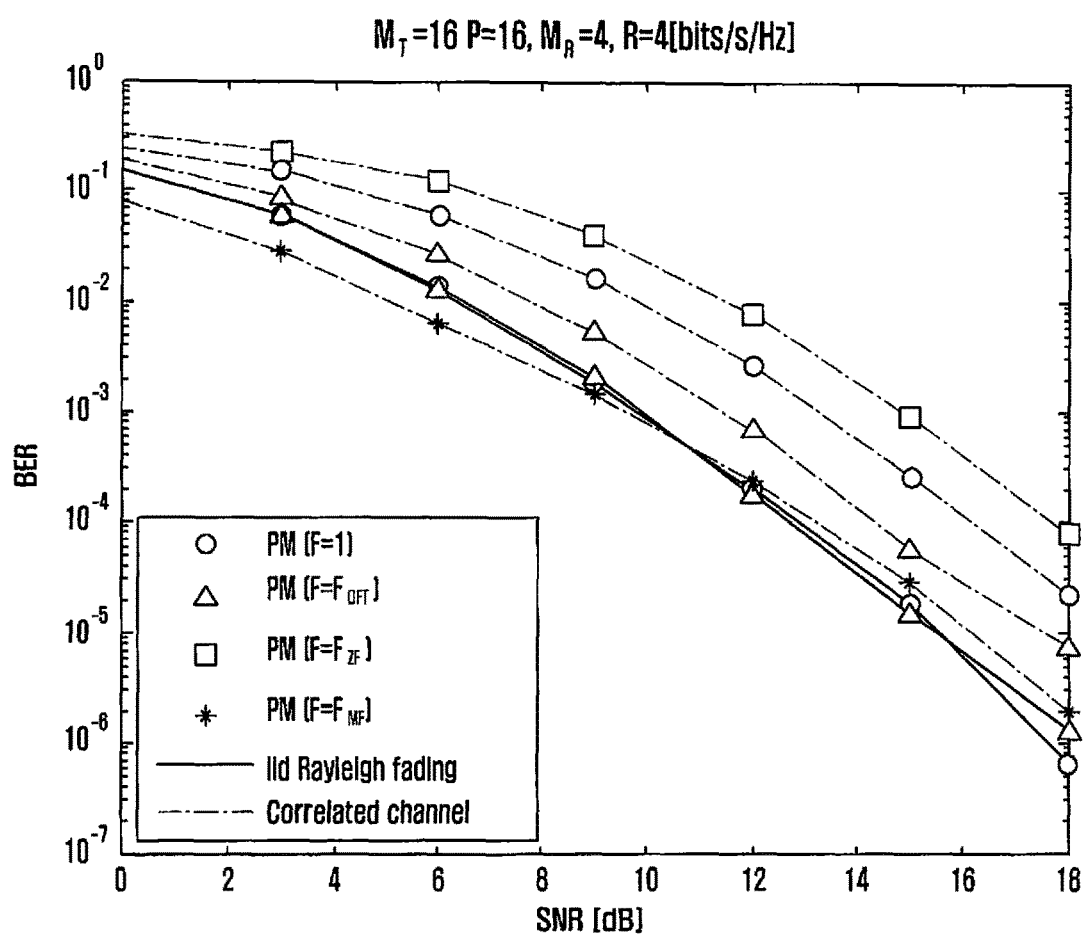

FIGS. 11a and 11b show examples of BER performance graphs according to each type of codebooks. FIGS. 11a and 11b show performance graphs when $M_T=16$, $P=16$, and correlation coefficient $\eta=0.7$.

Referring to FIGS. 11a and 11b, as described above, it can be understood that all the schemes have the same performance because $\lambda_1 = \ldots = \lambda_{M_T} = 1$ in the case of an iid Rayleigh fading channel, but a PM performance using an MF-type codebook is the most excellent when a transmission-end correlation exists. Such a tendency is maintained even when a plurality of reception antennas exist.

Figure 12A:
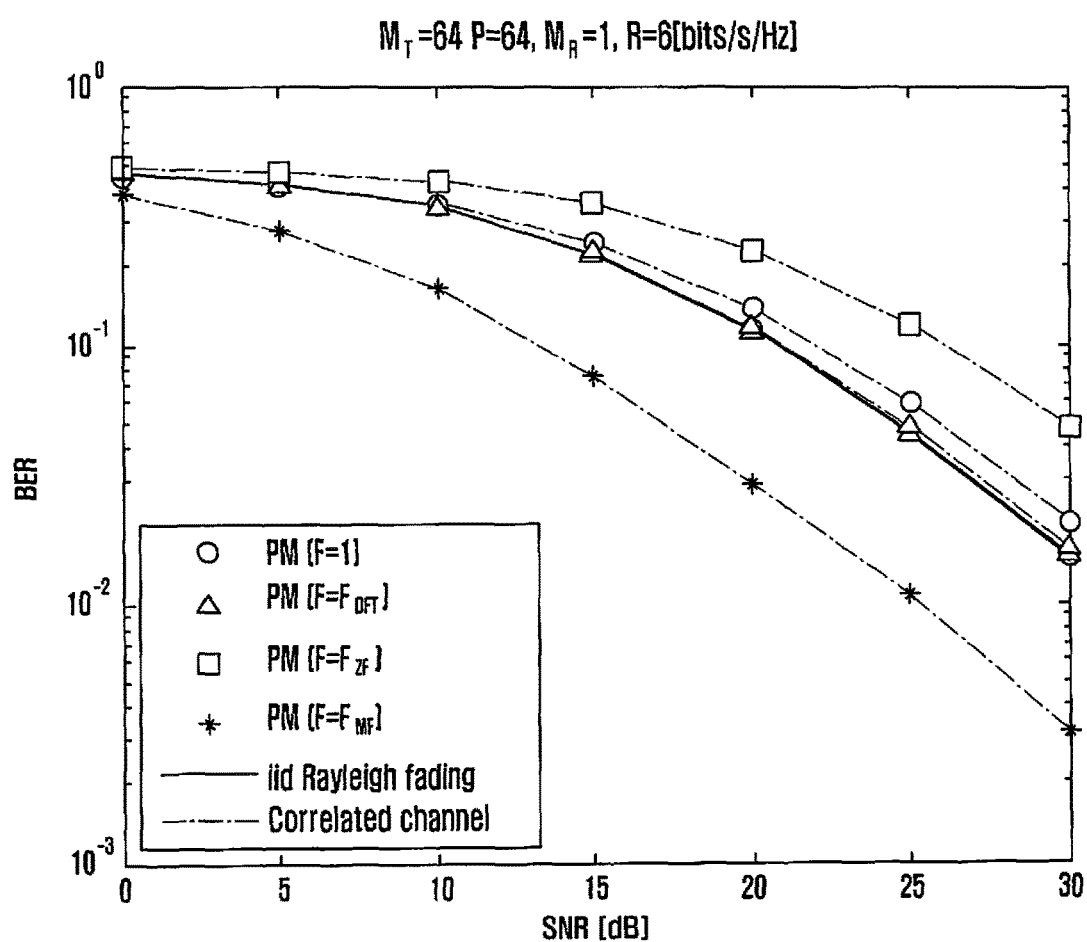
FIGS. 12a and 12b show other examples of BER performance graphs according to each type of codebooks.
Figure 12B:
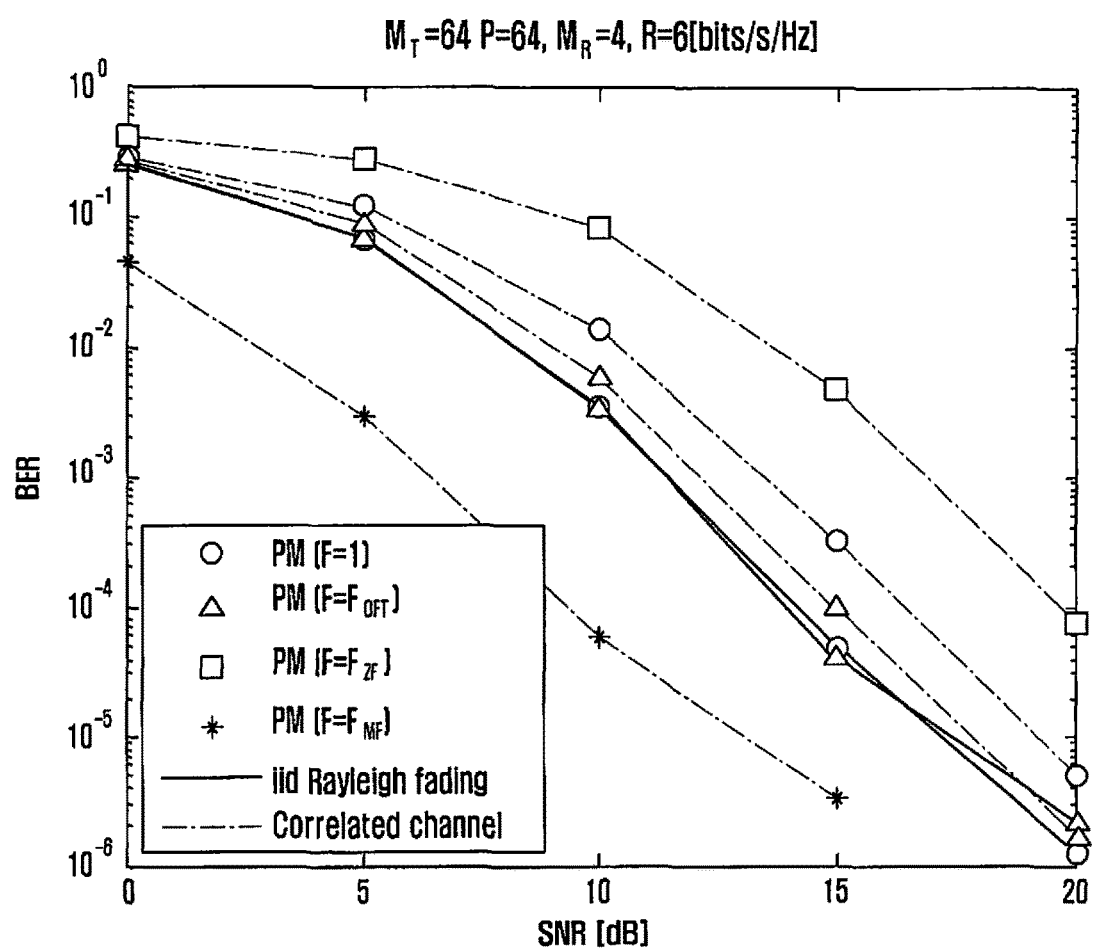

FIGS. 12a and 12b show other examples of BER performance graphs according to each type of codebooks. FIGS. 12a and 12b show performance graphs when $M_T=64$, $P=64$, and correlation coefficient $\eta=0.7$.

Referring to FIGS. 12a and 12b, it can be understood that, as the number of antennas increases, the distribution of eigenvalues of a transmission-end correlation matrix becomes larger, and thus a difference of performance according to types of codebooks becomes larger.

Hereinafter, a modulation order trade-off in a PM system will be described.

As described with reference to FIG. 7, there is a trade-off relation that, as the modulation order of PM increases for enhancement of throughput, an RS decoding burden increases. A coded modulation (CM) capacity of PM may be obtained using the following equation 20.

$$C_{CMPM} = \log_2(P) - E_{y,x,H_{eff}}\left[\log_2 \frac{\sum_{x' \in X} p_Y(y|x', H_{eff})}{p_Y(y|x, H_{eff})}\right] \quad \text{[Equation 20]}$$

When a coherent bandwidth is $N_{smooth}$ and a coherent time is $T_c$, a coherent bandwidth-time is $BT_{coh.} = N_{smooth} T_c$. Thus, when $BT_{coh.}$ is finite, the spatial efficiency of PM may be defined using equation 21.

$$\eta_{PM}(P) = \frac{N_{smooth} T_c - P}{N_{smooth} T_c} C_{CMPM}$$

$$= \frac{N_{smooth} T_c - P}{N_{smooth} T_c}\left[\log_2(P) - E_{y,x,H_{eff}}\left[\log_2 \frac{\sum_{x' \in X} p_Y(y|x', H_{eff})}{p_Y(y|x, H_{eff})}\right]\right]$$

[Equation 21]

Equation 21 shows that a spatial efficiency of PM shows a monotonic increasing function of $BT_{coh.}$ when an SNR has a sufficiently large value, which is a concave function of "P". That is to say, when a $BT_{coh.}$ is given, one optimal "P" can be found. With equation 21, a simple reference for estimating an optimal "P" on the basis of the coherent bandwidth-time of a terminal when the terminal has measured the coherent bandwidth-time thereof may be proposed. It may be assumed that the modulation orders of $m = \log_2 P$, $m=1, \ldots, 6$ are supported in a PM system. It is understood that, when an SNR has a sufficiently large value, the PM spatial efficiency with modulation order "m" and the PM spatial efficiency with modulation order "m+1" under the condition as the following equation 22 are the same as each other by equation 21.

$$\{BT_{coh} - 2^m\} \log_2 2^m = \{BT_{coh} - 2^{m+1}\} \log_2 2^{m+1}$$

$$BT_{coh} = 2^m(m+2) \quad \text{[Equation 22]}$$

Equation 22 shows that it is necessary to increase a modulation order when a measured $BT_{coh}$ is larger than "$2^m(m+2)$". With equation 22, an MOI mapping table such as table 1 may be established.

Figure 13A:
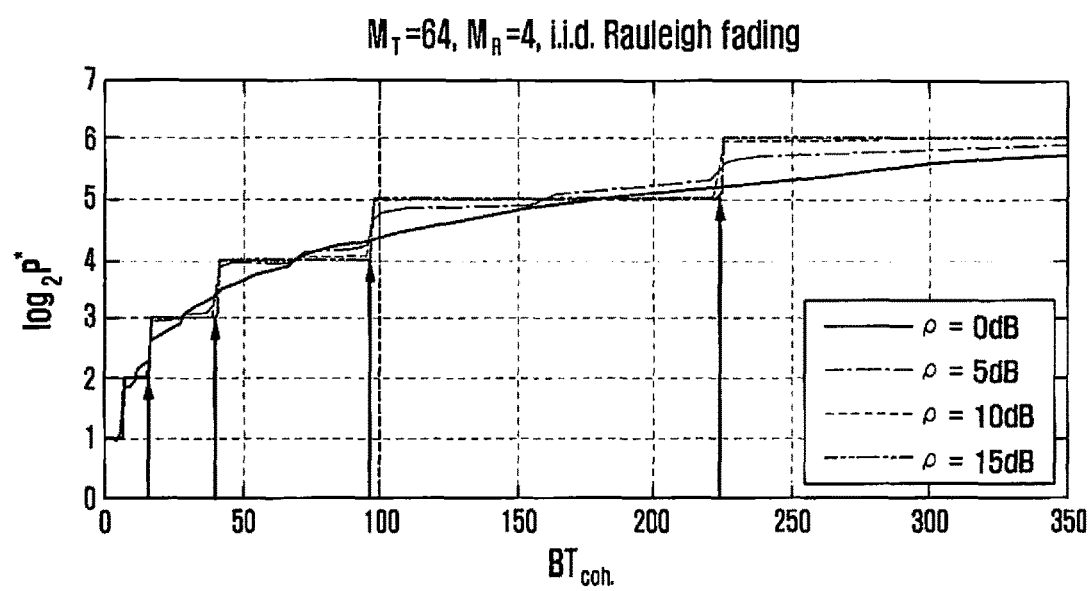
FIGS. 13a and 13b show the results of simulations for optimal modulation orders according to $BT_{coh}$ when MT=64 with respect to table 1 and equation 22.
Figure 13B:
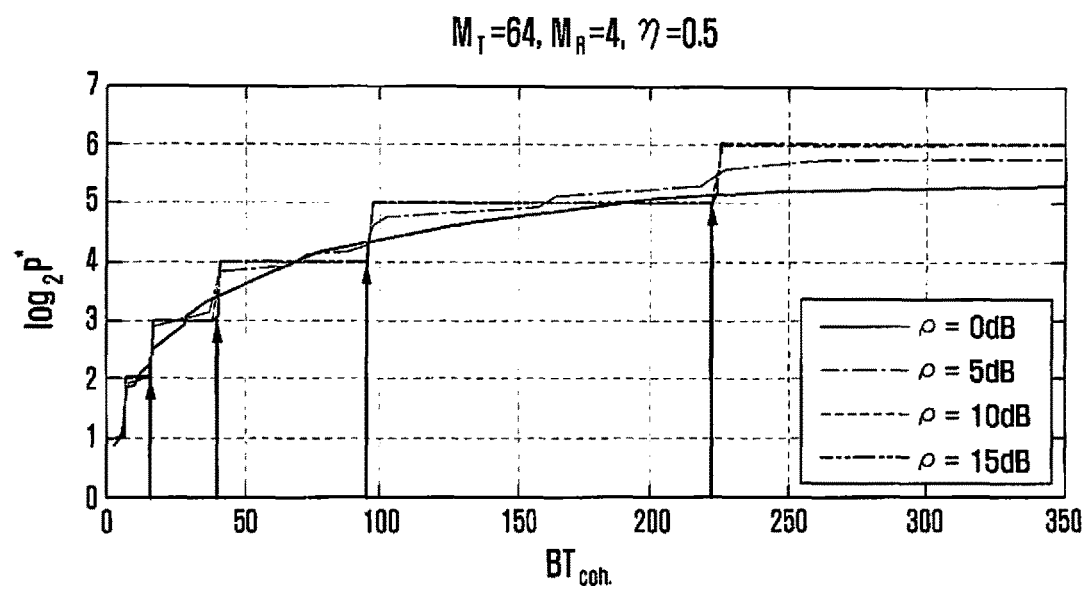

FIGS. 13a and 13b show the results of simulations for optimal modulation orders according to $BT_{coh}$ when $M_T=64$ with respect to table 1 and equation 22. It can be understood that, with respect to SNRs of p=5 dB or higher, a result that optimal modulation orders are identical to those in table 1 is shown.

Figure 14:
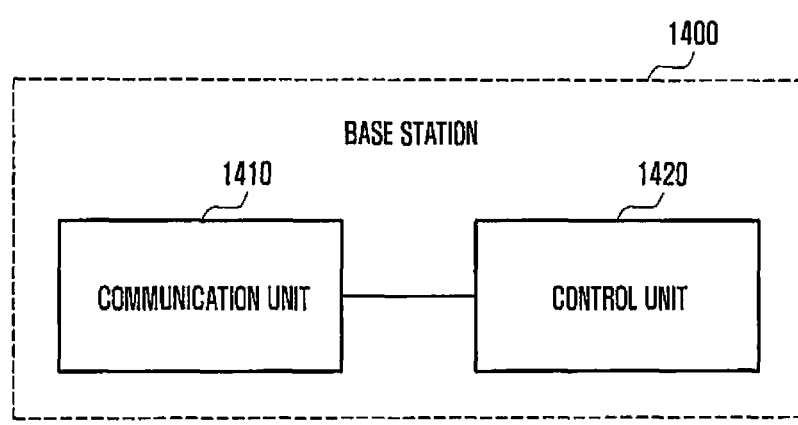
FIG. 14 is a block diagram illustrating the configuration of a base station 1400 according to an embodiment of the present invention.

FIG. 14 is a block diagram illustrating the configuration of a base station 1400 according to an embodiment of the present invention.

Referring to FIG. 14, according to an embodiment of the present invention, the base station 1400 may include a communication unit 1410 and a control unit 1420. The communication unit 1410 transmits and receives an RS, data, and other signals which are required according to any one of the aforementioned embodiments. Especially, the communication unit 1410 may transmit a signal including data and an RS to a terminal, and transmit, to the terminal, an MOI allocated to the terminal. The communication unit 1410 may receive channel estimation-related information, e.g. an MOI and/or a CCI, from the terminal. The control unit 1420 controls the components of the base station 1400 so that the base station 1400 can operate according to any one of the aforementioned embodiments. Especially, the control unit 1420 may allocate an MOI to the terminal, and control the communication unit 1410 to transmit a signal according to an RS structure corresponding to the MOI.

Figure 15:
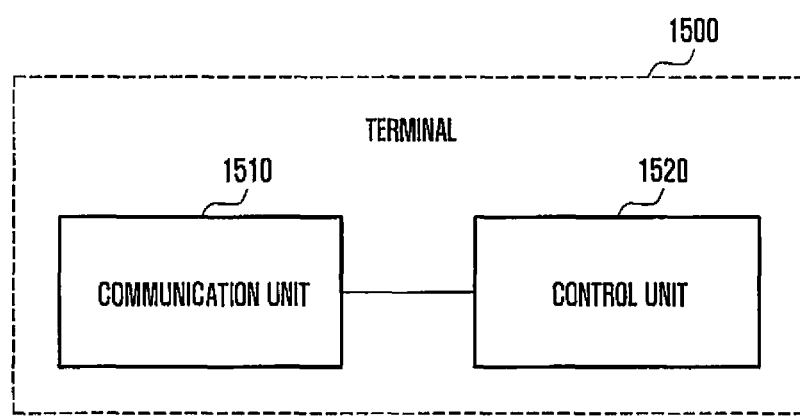
FIG. 15 is a block diagram illustrating the configuration of a terminal 1500 according to an embodiment of the present invention.

FIG. 15 is a block diagram illustrating the configuration of a terminal 1500 according to an embodiment of the present invention.

Referring to FIG. 15, according to an embodiment of the present invention, the terminal 1500 may include a communication unit 1510 and a control unit 1520. The communication unit 1510 transmits and receives an RS, data, and other signals which are required according to any one of the aforementioned embodiments. Especially, the communication unit 1510 may receive a signal including data and an RS from a base station, and receive an MOI allocated to the terminal. The communication unit 1510 may transmit channel estimation-related information, e.g. an MOI and/or a CCI, to the base station. The control unit 1520 controls the components of the terminal 1500 so that the terminal 1500 can operate according to any one of the aforementioned embodiments. Especially, the control unit 1520 may estimate the channel estimation-related information, and control the communication unit 1510 to receive a signal according to an RS structure corresponding to an MOI allocated to the terminal.

Here, it can be understood that each block of the flowcharts and a combination of the flowcharts can be performed by computer program instructions. Since computer program instructions can be loaded into a processor of a universal computer, a special computer or other programmable data processing equipment, instructions performed via a processor of a computer or other programmable data processing equipment generates means for performing functions described in block(s) of the flowcharts. Since the computer program instructions can be stored in a computer available or computer readable memory capable of configuring a computer or other programmable data processing equipment to implement functions in a scheme, instructions stored in the computer available or computer readable memory can produce manufacturing articles involving an instruction means executing functions described in block(s) of the flowcharts. Because the computer program instructions can be loaded onto a computer or other programmable data processing equipment, a series of operational steps are performed in the computer or other programmable data processing equipment to create a process executed by the computer or other programmable data processing equipment such that instructions performing by the computer or other programmable data processing equipment can provide steps for executing functions described in block(s) of the flowcharts.

Further, each block can indicate a part of a module, a segment, or a code including at least one executable instruction for executing specific logical function(s). It should be noted that several execution examples can generate functions described in blocks out of order. For example, two contiguously shown blocks can be simultaneously performed, and occasionally, the blocks may be performed in a converse order according to corresponding functions.

Here, the term "unit", as used in the embodiments, refers to software or a hardware component, such as an FPGA) or ASIC, which performs a predetermined function. However, the term "unit" is not limited to software or hardware. The "unit" can be configured to be included in an addressable storage medium and to play one or more processors. Accordingly, for example, the term "unit" includes components, such as software components, object-oriented software components, class components, and task structural components, processes, functions, attributes, procedures, subroutines, segments of a program code, drivers, firmware, microcode, circuit, data, database, data structures, tables, arrays, and variables. Functions provided in components and "units" may be engaged by a smaller number of components and "units", or may be divided into additional components and "units". Furthermore, components and "units" may be implemented to play one or more CPUs in a security multimedia card or a device.

Those skilled in the art will appreciate that various modifications, additions and substitutions are possible, without departing from the scope and spirit of the invention as disclosed in the accompanying claims. Therefore, it should be appreciated that the embodiments described above are not limitative, but only illustrative. The scope of the present invention is defined by the following claims, and all modified or varied forms derived from the meaning and scope of the claims and also equivalent concepts thereof should be interpreted to be included in the scope of the present invention.

INDUSTRIAL APPLICABILITY

Meanwhile, although the exemplary embodiments of the present disclosure have been illustrated in the present specification and the accompanying drawings and specific terms have been used, they are used in a general meaning in order to assist in the understanding the present disclosure and do not limit the scope of the present invention. It will be obvious to those skilled in the art to which the present disclosure belongs that other modifications based on the spirit of the present disclosure may be made in addition to the above-mentioned exemplary embodiments.

The invention claimed is:

1. A method for a terminal to transmit channel-related information, the method comprising:
    receiving, from a base station via higher layer signaling, configuration information on whether a modulation order indicator (MOI) for each frequency is to be fed back or one representative MOI for an entire frequency band is to be fed back;
    receiving, from the base station, a first reference signal (RS);
    estimating a modulation order corresponding to a channel state based on the first RS and estimating channel correlation corresponding to the channel state based on the first RS;
    transmitting, to the base station, channel-related information including a first MOI and a channel correlation index (CCI), wherein the first MOI indicates the estimated modulation order, the first MOI is to be fed back based on the configuration information, and the CCI indicates the estimated channel correlation; and
    receiving, from the base station, a second RS and data, wherein the second RS and the data are associated with a port modulation scheduling, the port modulation scheduling is determined based on the CCI and a second MOI allocated to the terminal, and the second MOI is determined based on the channel-related information.

2. The method of claim 1, further comprising:
    receiving the second MOI; and
    receiving a signal according to an RS structure corresponding to the second MOI.

3. The method of claim 1, further comprising:
    receiving a second signal having a preset RS structure by predetermined periods;
    estimating a modulation order corresponding to a channel state from the second signal when receiving the second signal; and
    transmitting channel-related information including a third MOI, which indicates the estimated modulation order, to the base station.

4. A terminal for transmitting channel-related information, the terminal comprising:
a transceiver; and
a controller coupled with the transceiver and configured to:
receive, from a base station via higher layer signaling, configuration information on whether a modulation order indicator (MOI) for each frequency is to be fed back or one representative MOI for an entire frequency band is to be fed back,
receive, from the base station, a first reference signal (RS),
estimate a modulation order corresponding to a channel state based on the first RS and estimate channel correlation corresponding to the channel state based on the first RS,
transmit, to the base station, channel-related information including a first MOI and a channel correlation index (CCI), wherein the first MOI indicates the estimated modulation order, the first MOI is to be fed back based on the configuration information, and the CCI indicates the estimated channel correlation, and
receive, from the base station, a second RS and data, wherein the second RS and the data are associated with a port modulation scheduling, the port modulation scheduling is determined based on the CCI and a second MOI allocated to the terminal, and the second MOI is determined based on the channel-related information.

5. The terminal of claim 4,
wherein the controller controls the transceiver to receive the second MOI and receive a signal according to an RS structure corresponding to the second MOI.

6. The terminal of claim 4,
wherein the transceiver receives a second signal having a preset RS structure by predetermined periods,
the controller estimates a modulation order corresponding to a channel state from the second signal when receiving the second signal, and
the transceiver transmits channel-related information including a third MOI, which indicates the estimated modulation order, to the base station.

7. A method for a base station to receive channel-related information, the method comprising:
configuring a port modulation;
transmitting, to a terminal via higher layer signaling, configuration information on whether a modulation order indicator (MOI) for each frequency is to be fed back or one representative MOI for an entire frequency band is to be fed back;
transmitting, to the terminal, a first reference signal (RS);
receiving, from the terminal, channel-related information including a first MOI and a channel correlation index (CCI), wherein the first MOI indicates an estimated modulation order corresponding to the first reference signal, the first MOI is to be fed back based on the configuration information, and the CCI indicates the estimated channel correlation; and
transmitting, to the terminal, a second RS and data, wherein the second RS and the data are associated with a port modulation scheduling, the port modulation scheduling is determined based on the CCI and a second MOI allocated to the terminal, and the second MOI is determined based on the channel-related information.

8. The method of claim 7, further comprising:
allocating the second MOI to the terminal by making reference to the first MOI; and
transmitting a signal according to an RS structure corresponding to the second MOI.

9. The method of claim 7, further comprising:
transmitting a second signal having a preset RS structure by predetermined periods; and
receiving channel-related information including a third MOI, which indicates an estimated modulation order corresponding to the second signal, from the terminal.

10. A base station for receiving channel-related information, the base station comprising: a transceiver; and
a controller coupled with the transceiver and configured to:
configure a port modulation,
transmit, to a terminal via higher layer signaling, configuration information on whether a modulation order indicator (MOI) for each frequency is to be fed back or one representative MOI for an entire frequency band is to be fed back,
transmit, to the terminal, a first reference signal (RS),
receive, from the terminal, channel-related information including a first MOI and a channel correlation index (CCI), wherein the first MOI indicates an estimated modulation order corresponding to the first reference signal, the first MOI is to be fed back based on the configuration information, and the CCI indicates the estimated channel correlation, and
transmit, to the terminal, a second RS and data, wherein the second RS and the data are associated with a port modulation scheduling, the port modulation scheduling is determined based on the CCI and a second MOI allocated to the terminal, and the second MOI is determined based on the channel-related information.

11. The base station of claim 10,
wherein the controller allocates the second MOI to the terminal by making reference to the first MOI, and
controls the transceiver to transmit a signal according to an RS structure corresponding to the second MOI.

12. The base station of claim 10,
wherein the controller controls the transceiver to transmit a second signal having a preset RS structure by predetermined periods, and the transceiver receives channel-related information including a third MOI, which indicates an estimated modulation order corresponding to the second signal, from the terminal.

* * * * *